United States Patent
Panov et al.

(10) Patent No.: US 10,303,533 B1
(45) Date of Patent: May 28, 2019

(54) REAL-TIME LOG ANALYSIS SERVICE FOR INTEGRATING EXTERNAL EVENT DATA WITH LOG DATA FOR USE IN ROOT CAUSE ANALYSIS

(71) Applicant: Amazon Technologies, Inc., Seattle, WA (US)

(72) Inventors: Nikita Panov, Seattle, WA (US); Munish Gopal, Kirkland, WA (US); Allan Le Nevez, Seattle, WA (US); Simon McEnlly, Seattle, WA (US); Daifu Ye, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 44 days.

(21) Appl. No.: 15/370,881

(22) Filed: Dec. 6, 2016

(51) Int. Cl.
*G06F 11/30* (2006.01)
*G06F 11/07* (2006.01)
*G06F 12/0813* (2016.01)
*G06F 11/32* (2006.01)
*G06F 11/34* (2006.01)

(52) U.S. Cl.
CPC ........ *G06F 11/0709* (2013.01); *G06F 11/079* (2013.01); *G06F 11/0751* (2013.01); *G06F 11/0769* (2013.01); *G06F 11/3006* (2013.01); *G06F 11/3072* (2013.01); *G06F 11/321* (2013.01); *G06F 11/3476* (2013.01); *G06F 12/0813* (2013.01); *G06F 2212/62* (2013.01)

(58) Field of Classification Search
CPC .. G06F 11/3072; G06F 11/324; G06F 11/321; G06F 11/3476; G06F 12/0813; H04L 41/02; H04L 41/22
See application file for complete search history.

(56) References Cited

U.S. PATENT DOCUMENTS

| | | | |
|---|---|---|---|
| 8,707,194 B1* | 4/2014 | Jenkins | H04L 67/025 715/772 |
| 8,850,263 B1* | 9/2014 | Yourtee | G06F 11/0709 714/20 |
| 9,633,106 B1* | 4/2017 | Saurabh | G06F 17/30598 |
| 9,900,332 B2* | 2/2018 | Muddu | G06N 99/005 |
| 2011/0099500 A1* | 4/2011 | Smith | G06F 3/0482 715/771 |
| 2014/0324862 A1* | 10/2014 | Bingham | G06F 17/30572 707/737 |

(Continued)

*Primary Examiner* — Yolanda L Wilson
(74) *Attorney, Agent, or Firm* — Lee & Hayes, P.C.

(57) ABSTRACT

A real-time log analyzer ("RTLA") network service obtains log data from host computers. The RTLA network service also obtains event data from external network services. A user interface ("UI") associated with the RTLA network service retrieves the log data and the event data from the RTLA network service for a time period, and presents the log data and the event data for the time period together for use in analyzing the root cause of failures indicated in the log data. The UI can also provide functionality for defining the time period, selecting the hosts for which log data and event data is to be presented, specifying the type of log data and event data to be displayed or otherwise filtering the log and event data, displaying data from a trouble ticket system, defining and displaying annotations relating to the event data, and/or displaying a human-friendly description of the event data.

20 Claims, 11 Drawing Sheets

(56) References Cited

U.S. PATENT DOCUMENTS

| | | | |
|---|---|---|---|
| 2015/0293954 A1* | 10/2015 | Hsiao | G06F 17/30312 |
| | | | 715/738 |
| 2016/0306965 A1* | 10/2016 | Iyer | G06F 21/552 |
| 2017/0093645 A1* | 3/2017 | Zhong | G06F 3/0482 |
| 2017/0140039 A1* | 5/2017 | Neels | G06F 17/30696 |

\* cited by examiner

# REAL-TIME LOG ANALYSIS SERVICE FOR INTEGRATING EXTERNAL EVENT DATA WITH LOG DATA FOR USE IN ROOT CAUSE ANALYSIS

BACKGROUND

Real-time log analysis ("RTLA") can allow an organization to monitor the service and error logs of a number of host computers and/or devices in real or near-real time in order to identify trends in service performance as well as to troubleshoot potential problems. An RTLA system can collect log data from the host computers and/or devices, process and collate the collected data, and analyze the collated data to generate service metrics. These metrics and/or the log data itself can then be published to host management systems, alarming and alerting services, reporting and graphing services and support services.

The generated metrics can include fatal error counts/rates, page views, service availability, host access rates, hardware performance measures and the like. Management and technical support personnel can utilize the published metrics and the processed and collated log data to be alerted to potential problems or failures, troubleshoot host or service problems, determine additional resources that need to be made available to meet growing demand, spot trends in service or product demand and the like.

Log data that describes a problem or failure with a host computer or device does not, however, typically provide significant insight into the root cause of the problem or failure. For example, and without limitation, a host computer might experience errors immediately following the deployment of a software update to the host. In a scenario such as this, it can be very difficult and time consuming to determine that the software deployment was the root cause of the errors appearing in the log files on the host computer.

The disclosure made herein is presented with respect to these and other considerations.

DETAILED DESCRIPTION

Figure 1:
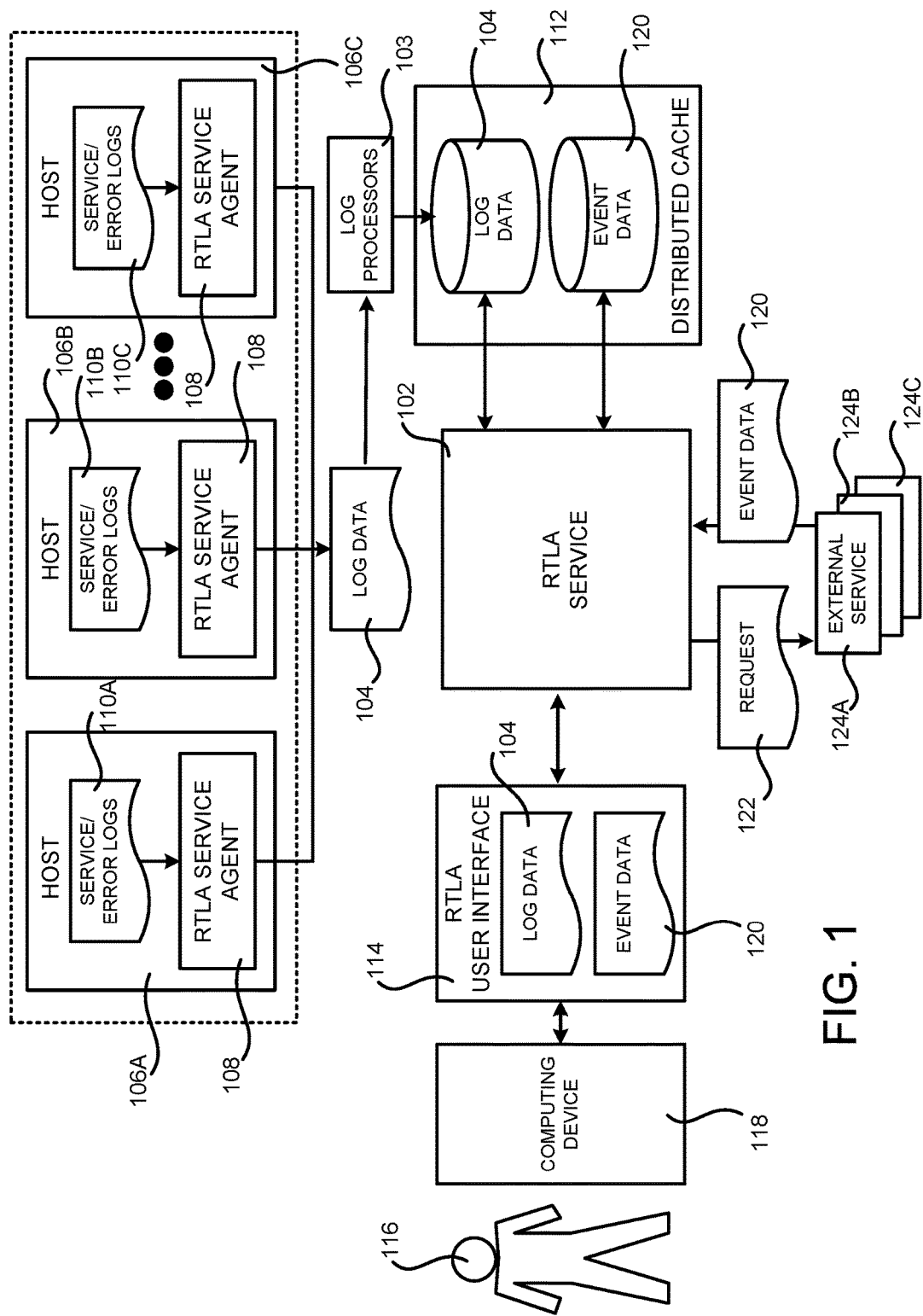
FIG. 1 is a computing system architecture diagram showing aspects of a computing system configured to provide an RTLA service capable of integrating log data with event data generated by external services for use in root cause analysis, according to one particular configuration.

The following detailed description is directed to technologies for integrating log data with event data generated by external services for use in root cause analysis. In particular, this patent application relates to an RTLA service and an associated user interface ("UI") capable of integrating log data with event data generated by external services. The integration of log data with event data generated by external services can assist in root cause analysis and allow the root cause of problems or errors effecting a host computer to be identified more quickly. Quicker identification of the root cause of a problem can save significant power, processing, memory, and other computing resources. Technical effects other than those mentioned specifically herein can also be realized through an implementation of the disclosed technologies.

As will be disclosed in greater detail below, an RTLA network service is disclosed herein that is configured to obtain log data from host computers. The RTLA network service also obtains event data from external network services. An associated UI retrieves the log data and the event data from the RTLA network service for a time period, and presents the log data and the event data for the time period together for use in analyzing the root cause of failures indicated in the log data.

The RTLA UI can also provide functionality for defining the time period for which log and event data is to be presented, selecting the hosts for which the log data and event data is to be presented, specifying the type of log data and event data to be displayed and/or otherwise filtering the log and event data, displaying data from a trouble ticket system or another type of system storing data associated with the event data, defining and displaying annotations relating to the event data, displaying a human-friendly text description of the event data, and/or providing other types of functionality. Additional details regarding the various components and functionality described briefly above will be provided below with regard to FIGS. 1-7.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can also be practiced in distributed computing environments, such as a distributed computing network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a computing system architecture diagram showing aspects of a computing system configured to provide an RTLA service 102 capable of integrating log data 104 with event data 120 generated by one or more external services 124, according to one particular configuration. The computing system shown in FIG. 1 includes a number of monitored hosts 106, such as the hosts 106A-106C (referred to herein generally as a "host 106" or "hosts 106"). The hosts 106 can include application servers, Web servers, database servers, communication servers, personal computers, network appliances or any other computing device known in the art. The hosts 106 can be implemented as hardware or as virtual machines executing on a host hardware platform.

The hosts 106 can execute any number of services and/or applications known in the art, such as Web services, database services, application services, storage services, data processing services and the like. As is further known in the art, the services and/or applications executing on the hosts 106 can log errors and other events in service and error logs 110 on the host. For example, and without limitation, the host 106A maintains the service and error logs 110A, the host 106B maintains the service and error logs 110B, and the host 106C maintains the service and error logs 110C. The service and error logs 110 can include service event logs, application event logs, access logs, hardware event logs and other types of log files generated by applications or services executing on the hosts 106.

Each host 106 can also execute an RTLA service agent 108. The RTLA service agent 108 can be implemented as software, hardware or any combination of the two. According to configurations, the RTLA service agent 108 can scan service and error logs 110 on the host 106 for particular types of log or error messages generated by the executing services and applications or the host hardware. For example, and without limitation, the RTLA service agent 108 can be configured to scan the service and error logs 110 to identify fatal errors, such as HTTP errors generated by a Web service, or internal application failures from an application executing on the host 106.

The RTLA service agent 108 can also periodically collect the identified log messages, which will be referred to herein collectively as "log data 104," from the various service and error logs 110 and transmit the log data 104 to a number of log processors 103 executing as a part of the RTLA service 102. Log data 104 includes data derived from the log messages retrieved from the hosts 106. In some configurations, the RTLA service agent 108 is further configured to identify and filter data from the log messages that might be more interesting to consumers of the log data 104. For example, and without limitation, the RTLA service agent 108 can be configured to report log messages having the same signature fatal error only once, or in the case of a series of fatal errors, only extract a stack trace from the associated log messages, for example.

The log processors 103 can be implemented using conventional server computers, virtual machines executing on a host hardware platform, network appliances or any combination of these and other computing devices. The log processors 103 can be connected to the hosts 106 by one or more networks (not shown), for example. The log processors 103 can also include one or more software or hardware modules executing on the log processors 103 and/or other computing platforms. The RTLA service agent 108 can transmit the log data 104 collected on a host 106 to a particular log processor 103 based on local configuration parameters, for example.

In some configurations, the RTLA service agent 108 selects the log processor 103 to which to transmit the log data 104 based on the particular service or error log 110 from which the log data 104 was extracted and/or the like. According to some configurations, the RTLA service agent 108 can collect the log data 104 from the service and error logs 110 at a configured interval, such as every minute, and transmit the log data to the log processors 103 in one minute log data chunks. It will be appreciated that other intervals beyond one minute can be configured, and that the interval can affect the latency of making representative log data 104 and metrics available to consumers from the service and error logs 110 of the hosts 106 by the RTLA service 102.

The log processors 103 can receive the log data chunks and split the log data chunks into one or more databases or log data files, such as data tables, indexes and the like. The log processors 103 can further provide the processed log data in data cubes. The dimensions in the data cubes can include host identifier ("ID"), host type, host session, page ID, page type, request ID, request type, customer ID, source log and/or other categories of the logged messages. The log data 104 can be accumulated in log data files and the data cubes over the configured interval of each log data chunk, producing one minute data cubes, for example. In further configurations, the log processors 103 can summarize dimensions over total log data, and not just the identified fatal error log messages, for example.

The log processors 103 can then store the processed log data 104 in the log data files and data cubes for the configured interval in an appropriate networked storage location (referred to herein as a "backing store") and, potentially, an associated distributed cache 112 and made available to other services for consumption, as will be described below. For example, the log RTLA service 102 can provide an application programming interface ("API") (not shown in FIG. 1) for the consumption of the stored log data 104. Additionally or alternatively, the RTLA service 102 can push the processed log data 104 to other network services for consumption, such as a long-term storage service (not shown in FIG. 1) that can store the received log data 104 for future analysis.

Although not illustrated, the computing system shown in FIG. 1 can further include one or more data accumulation servers. The data accumulation servers can be implemented as conventional server computers, virtual machines executing on a host hardware platform, network appliances or any combination of these and other computing devices. The data accumulation servers can be connected to the log processors 103 described above by one or more networks (not shown in FIG. 1). A number of data accumulation tasks can execute on the data accumulation servers. The data accumulation tasks can be implemented using one or more hardware modules or software components executing on the log processing servers and/or other computing platforms.

The data accumulation tasks can pull the data cubes described above and their associated log data files from the log processing servers and generate merged cubes. The merged cubes can include log data 104 from multiple log processors or log processors merged across hosts 106, across multiple configured intervals and the like. In addition, the data accumulation tasks can collate the log data in the merged cubes across one or more dimensions. For example, a single request, identified by a request ID, can result in fatal error messages logged in multiple service and error logs 110 or across multiple hosts 106, such as in the case where a request is received by a Web service, which then issues multiple requests to other services to collect content to satisfy the original request. The data accumulation tasks can collate the multiple log messages from across the hosts 106 and/or service and error logs 110 by request ID, in order to eliminate redundant fatal errors for a single request.

The data accumulation tasks can then utilize the merged cubes to generate a number of configured metrics and other accumulated log data 104 for the monitored hosts 106. Such metrics can include, but are not limited to, fatal error rates over time, error rates by function or module, request counts and latency, hardware errors, security metrics, CPU utilization, free memory and available storage space and any other metrics that can be determined from the log data. The data accumulation tasks can further be configured to utilize consumer-configured log messages generated by services and applications executing on the monitored hosts 106 to calculate customizable metrics, such as access rates by webpage, views by product, access by region or location, access by user demographic, inventory usage or spoilage and/or any other measure that might be important to business or operational performance of the services and applications on the monitored hosts 106.

The generated metrics and other accumulated log data 104 can then be published to consumers, as discussed above and in further detail below. Consumers of the log data 104 can include, but are not limited to: monitoring/alerting services that can be configured to alert administrative or support personnel when one or more metrics are out of bounds or when a trend in the metric is noticed; host management services that can include the ability to provision and initiate additional hosts, services and/or other resources in response to the metrics or trends in the metrics; reporting services that provide administrative or support personnel insight into the operations of the hosts 106 and allow investigation of failures or other problems; long term storage services so that the metrics and other accumulated log data 104 can be stored over longer periods for future analysis; and any other consumers of the log data 104 that can be imagined by one skilled in the art. Additional details regarding the configuration and operation of a particular RTLA service 102 can be found in U.S. Pat. No. 8,850,263, which issued on Sep. 30, 2014, is entitled "Streaming and Sampling in Real-Time Log Analysis," and which is expressly incorporated herein by reference in its entirety.

As discussed briefly above, the log data 104 can provide significant insight into problems, faults, errors, and/or other types of conditions being experienced by the hosts 106. This data does not, however, typically provide meaningful insight into the root cause of the problem or failure being experienced by a host 106. For example, and without limitation, a host 106 might experience errors immediately following the deployment of a software update to the host 106. In a scenario such as this, it can be very difficult and time consuming to determine that the software deployment was the root cause of the errors appearing in the service and error logs 110 on the host 106.

In order to address the challenges set forth above, and potentially others, the RTLA service 102 also provides functionality for integrating the log data 104 obtained from the hosts 106 with event data 120 that is obtained from one or more external services 124A-124C. The event data 120 is data describing events occurring at an external service 124 that is related to the operation of a host computer 106. For example, and without limitation, an external service 124 can be a deployment service that deploys program code to the host computers 106 for execution. In this example, the event data 120 can describe deployments of program code to a host computer 106 and/or other types of events occurring at the deployment service. In this regard, it is to be appreciated that the external services 124 can be any type of network service that are external to the RTLA service 102 and the host computers 106, and that generate events that might impact the operation of the host computers 106.

As discussed briefly above, a UI 114 also operates in conjunction with the RTLA service 102 in one configuration. The UI 114 can be presented on a computing device 118, such as desktop or laptop computer, tablet, smartphone, or other type of computing device. A user 116 can view and interact with the UI 114 in order to view the log data 104 and the event data 120 and, potentially, to gain insight into the root cause of a failure indicated by the log data 104. As also discussed above, the UI 114 retrieves the log data 104 for a group of hosts 106 and time period from the RTLA service 102. The RTLA service 102 can expose a network services application programming interface ("API") (not shown in FIG. 1) through which the UI 114 can retrieve the log data 104.

Similarly, the UI 114 can retrieve event data 120 for a group of hosts 106 for the time period from the RTLA service 102, also utilizing a network services API. If the RTLA service 102 does not locate event data 120 in the distributed cache 112 or the backing store for the hosts 106 and time period requested, the RTLA service 102 can transmit a request 122 to the appropriate external service 124, or services 124, for the event data 120. The external services 124 can also expose network services APIs through which the RTLA service 102 can obtain the event data 120. The RTLA service 102 then stores the retrieved event data 120 in the distributed cache 120 and provides the requested event data 120 to the UI 114 for presentation.

In one particular implementation, the UI 114 is implemented utilizing asynchronous JavaScript and XML (which is commonly referred to as "AJAX"). Through an implementation that utilizes AJAX, the UI 114 can request and receive log data 104 and event data 120 from the RTLA service 102 asynchronously and without blocking the functionality provided by the UI 114. In this regard it is to be appreciated that other technologies can be utilized to implement the UI 114 in other configurations. Additionally, the distributed cache 112 is implemented in one configuration utilizing the CACHEOUT distributed cache and its JAVA client library, CACHMERE. Other components can be utilized to implement the distributed cache 112 in other configurations.

As will be described in greater detail below, the UI 114 can also provide functionality for defining the time period for which log data 104 and event data 120 is to be presented, selecting the hosts 106 for which the log data 104 and event data 120 is to be presented, specifying the type of log data 104 and event data 120 to be displayed and/or otherwise filtering the log data 104 and event data 120, displaying data from a trouble ticket system (not shown in FIG. 1) or another type of system storing data associated with the event data 120, defining and displaying annotations relating to the event data 120, displaying a human-friendly text description of the event data 120, and/or providing other types of functionality. Additional details regarding the operation of the RTLA service 102 will be provided below with regard to FIGS. 2A and 2B. Additional details regarding the operation of the UI 114 will be provided below with regard to FIGS. 3 and 4A-4D.

Figure 2A:
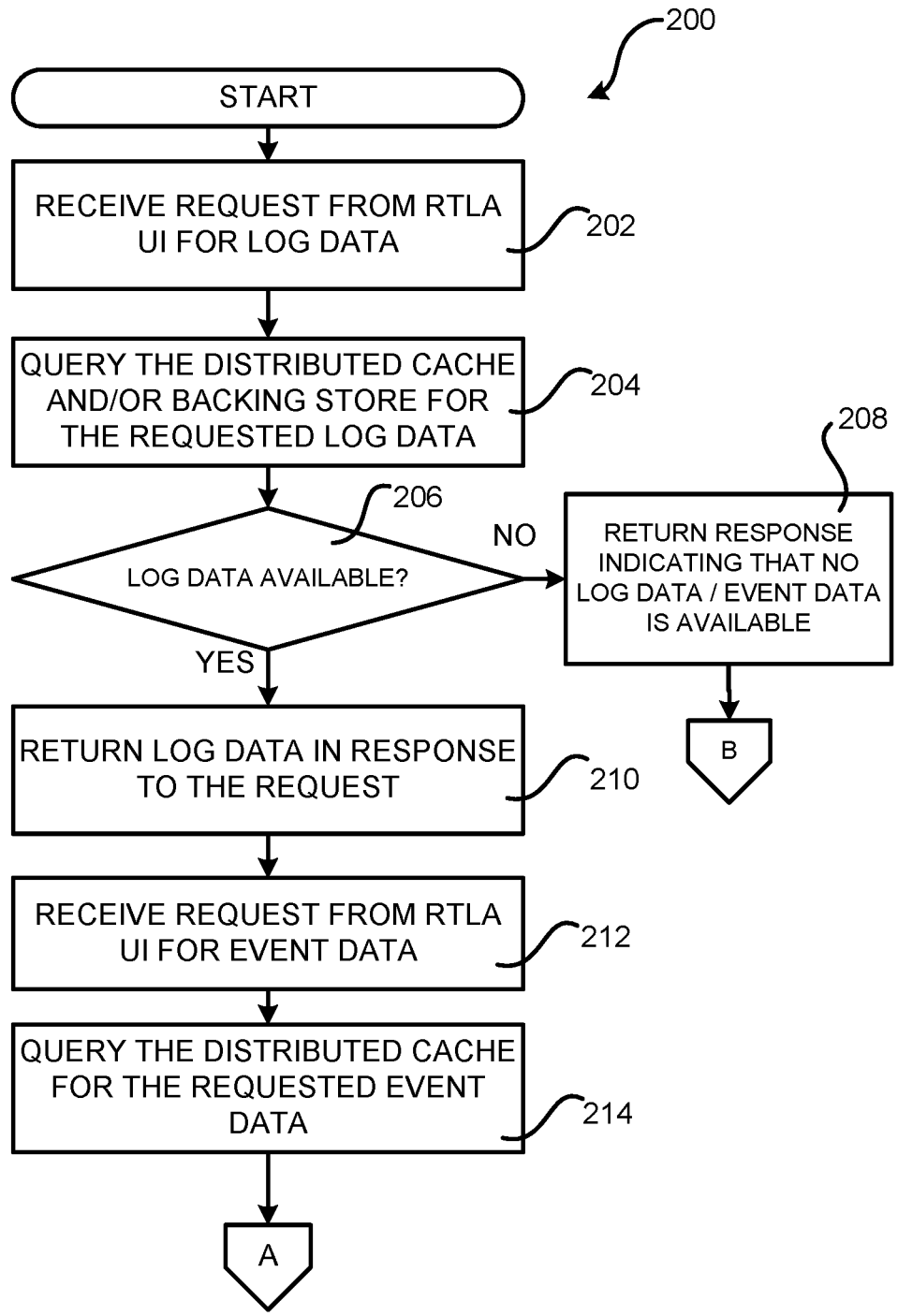
FIGS. 2A and 2B are flow diagrams showing aspects of a routine that illustrates one method for processing requests for log data and event data at an RTLA service, according to one particular configuration.
Figure 2B:
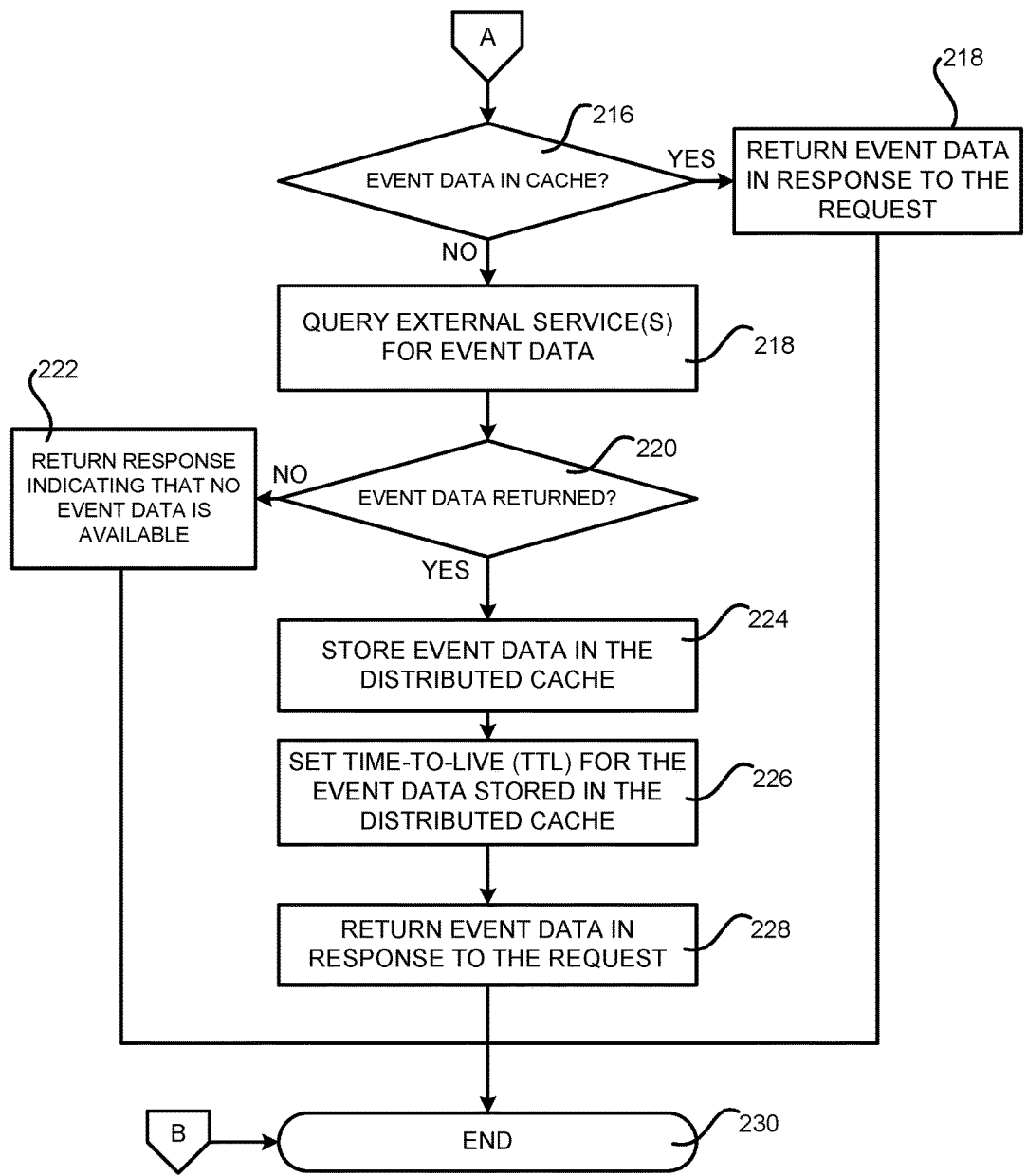

FIGS. 2A and 2B are flow diagrams showing a routine 200 that illustrates one method for processing requests for log data 104 and event data 120 at the RTLA service 102, according to one particular configuration. It should be appreciated that the logical operations described herein with respect to FIGS. 2A and 2B, and the other FIGS., can be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special-purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 200 begins at operation 202, where the RTLA service 102 receives a request from the UI 114 for log data 104 for a group of hosts 106 and for a particular period of time. As discussed above, the RTLA service 102 can expose a network services API through which the UI 114 can request the log data 104. From operation 202, the routine 200 proceeds to operation 204.

At operation 204, the RTLA service 102 queries the distributed cache 112 (and a backing store for the cache 112 if the log data 104 is not found in the cache 112) for the log data 104 for the identified hosts 106 and the identified time period. If log data 104 does not exist in the distributed cache 112 (or the backing store) for the identified hosts 106 and time period, the routine 200 proceeds from operation 206 to operation 208. At operation 208, the RTLA service 102 can return a response to the UI 114 indicating that no log data 104 (and no event data 120) is available for the identified hosts 106 and time period. The routine 200 can then proceed from operation 208 to operation 230 (shown in FIG. 2B), where it ends.

If log data 104 for the identified hosts 106 and time period is stored in the distributed cache 112 (or the backing store), the routine 200 proceeds from operation 206 to operation 210. At operation 210, the RTLA service 102 returns the requested log data 104 to the RTLA UI 114 in response to the request. The routine 200 then proceeds from operation 210 to operation 212.

At operation 212, the RTLA service 102 receives a request from the UI 114 for event data 120 for the hosts 106 and the time period for which log data 104 was requested at operation 202. In response thereto, the RTLA service 102 queries the distributed cache 112 for event data 120 for the identified hosts 106 during the identified time period. If event data 120 exists in the distributed cache 112 for the identified hosts 106 and time period, the routine 200 proceeds from operation 216 to operation 218. At operation 218, the RTLA service 102 returns the requested event data 120 stored in the distributed cache 112 to the UI 114 in response to the request. The routine 200 then proceeds from operation 218 to operation 230, where it ends.

If, at operation 216, the RTLA service 102 determines that the distributed cache 112 does not store event data 120 for the identified hosts 106 and time period, the routine 200 proceeds from operation 216 to operation 218. At operation 218, the RTLA service 102 queries the external services 124 for event data 120 for the identified hosts 106 during the identified time period. The routine 200 then proceeds from operation 218 to operation 220.

At operation 220, the RTLA service 102 determines whether event data 120 was provided from the external services 124 for the identified hosts 106 and time period. If no event data 120 was returned for the identified hosts 106 and time period, the routine 200 proceeds from operation 220 to operation 222. At operation 222, the RTLA service 102 returns a response to the UI 114 indicating that no event data 120 is available for the identified hosts 106 during the identified time period. If, however, event data 120 is returned from the external services 124, the routine 200 proceeds from operation 220 to operation 224.

At operation 224, the RTLA service 102 stores the event data 120 retrieved from the external services 124 in the distributed cache 112. The routine 200 then proceeds from operation 224 to operation 226, where the RTLA service 102 sets a time-to-live ("TTL") value for the event data 120 in the distributed cache 112. In one particular configuration, the TTL value is set to one value (e.g. an hour) if the identified time period is completely in the past and is set to a second value (e.g. one minute) shorter than the first value if the identified time period is not completely in the past. The TTL value can be set in other ways in other configurations.

From operation 226, the routine 200 proceeds to operation 228, where the event data 120 for the identified hosts 106 and identified time period is returned to the UI 114 in response to the original request. The routine 200 then proceeds from operation 228 to operation 230, where it ends.

It is to be appreciated that while FIGS. 2A and 2B illustrate a mechanism for "lazily" obtaining the event data 120 from the external services 124 and caching the event data 120, other mechanisms can be utilized in other configurations. For example, and without limitation, the RTLA service 102 might retrieve the event data 120 from the external services 124 on a schedule and store the event data 120 in the distributed cache 112. Alternately, and as another example, the external services 124 might be configured to periodically "push" the event data 120 to the RTLA service 102 or, potentially, directly to the distributed cache 112. Other mechanisms can also be utilized in other configurations.

Figure 3:
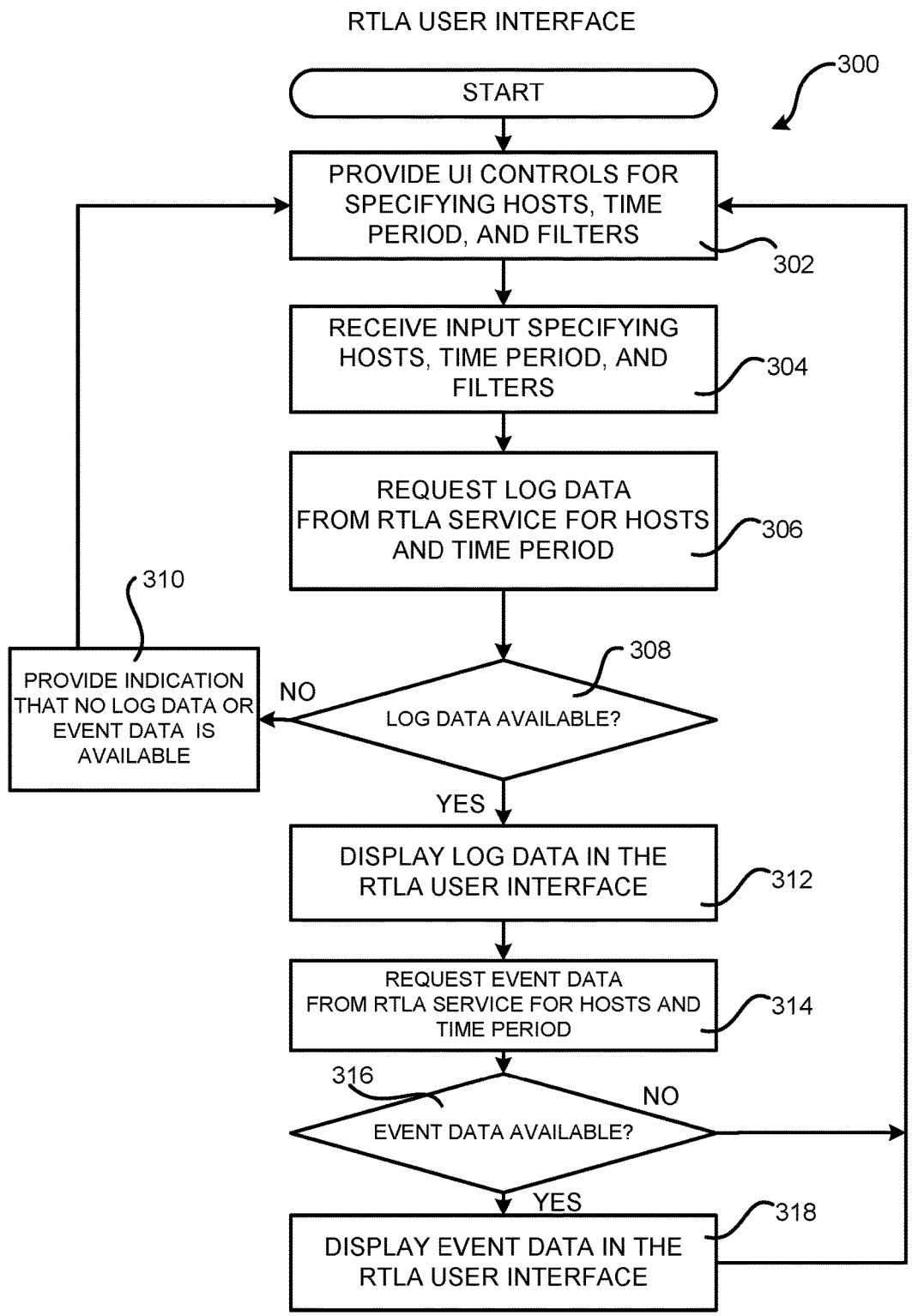
FIG. 3 is a flow diagram showing aspects of a routine that illustrates one method for providing a user interface that presents both log data and event data for use in root cause analysis, according to one particular configuration.

FIG. 3 is a flow diagram showing a routine 300 that illustrates one method for providing a UI 114 that presents both log data 104 and event data 120 for a time period simultaneously, according to one particular configuration. The routine 300 begins at operation 302, where the UI 114 provides UI controls for specifying the hosts 106 for which log data 104 and event data 120 is to be presented. UI controls can also be provided in the UI 114 for specifying the time period within which relevant log data 104 and event data 120 is to be retrieved. The UI controls can also be provided in the UI 114 for specifying filters for limiting the type of log data 104 and event data 120 that is to be displayed. The UI 114 can also provide UI controls for performing other types of functions in other configurations. One illustrative UI 114 will be described below with regard to FIGS. 4A-4D.

From operation 302, the routine 300 proceeds to operation 304, where the UI 114 receives input through the UI controls specifying the hosts 106, the time period, and/or filters for the log data 104 and event data 120. The routine 300 then proceeds from operation 304 to operation 306, where the UI 114 requests the log data 104 for the specified hosts 106 and time period from the RTLA service 102. The routine 300 then proceeds to operation 308, where the UI 114 determines whether the requested log data 104 is available from the RTLA service 102. If the requested log data 104 is available from the RTLA service 102, the routine 300 proceeds from operation 308 to operation 310, where an indication can be provided in the UI 114 that no log data 104 or event data 120 is available for the specified hosts 106 and time period.

If the requested log data 104 is available from the RTLA service 102, the routine 300 proceeds from operation 308 to operation 312. At operation 312, the UI 114 displays the log data 104 received from the RTLA service 102. The routine 300 then proceeds to operation 314, where the UI 114 requests event data 120 from the RTLA service 102 for the specified hosts 106 and time period. If no event data 120 is available for the specified hosts 106 and time period, the routine 300 proceeds from operation 316 back to operation 302, described above.

If event data 120 is available for the specified hosts 106 and time period, the routine 300 proceeds from operation 316 to operation 318, where the UI 114 receives the event data 120 from the RTLA service 102 and displays the received event data 120 for the specified hosts 106 and time period. The routine 300 then proceeds from operation 318 to operation 302, described above. One illustrative UI 114 will be described below with regard to FIGS. 4A-4D.

Figure 4A:
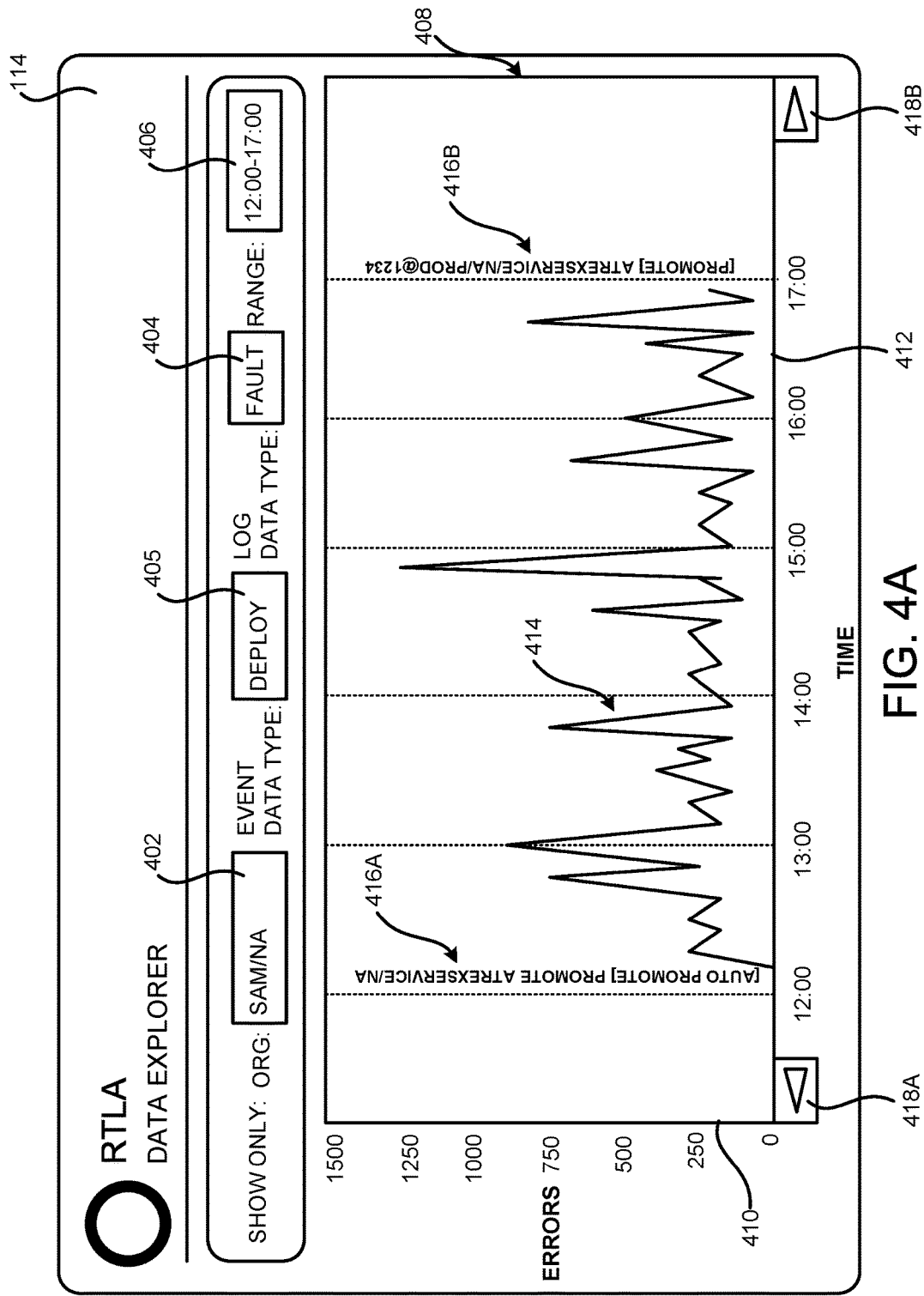
FIGS. 4A-4D are user interface diagrams showing several illustrative configurations for a user interface that presents both log data and event data, according to one particular configuration.

FIGS. 4A-4D are UI diagrams showing several illustrative configurations for a UI 114 that presents both log data 104 and event data 120 for a time period simultaneously, according to one particular configuration. As shown in FIG. 4A, the UI 114 includes a UI pane 408 in one configuration for presenting the log data 104 and the event data 120. In this example, the log data 104 is presented as a line graph 414. It is to be appreciated, however, that other types of graphs can be utilized in other configurations.

In the example shown in FIG. 4A, the event data 120 is presented as an overlay on the line graph 414. In particular, the event data 120 for the specified time period is presented as vertical text 416A and 416B in the configuration shown in FIG. 4A. Each instance of vertical text 416A and 416B corresponds to a particular event in the event data 120 and includes a text description of the event. In the example shown in FIG. 4A, for instance, the vertical text 416A corresponds to an "auto promote" event triggered by a deployment service, while the vertical text 416B corresponds to a "promote" event, also triggered by the deployment service. The vertical text 416A and 416B can also provide additional information regarding the corresponding event such as, for instance, the identity of the host 106, or hosts 106, impacted by the corresponding event. Other information can also be presented.

As also shown in FIG. 4A, the UI pane 408 includes an X-axis 412 and a Y-axis 410. In this example, the X-axis corresponds to time, while the Y-axis corresponds to the number of errors, or faults, generated by the specified hosts 106. In this regard, the UI 114 can include UI controls 406, 418A, and 418B for specifying the time period within which log data 104 and event data 120 is to be presented. In the example shown in FIG. 4A, for instance, the time period between 12:00 and 17:00 has been specified using the UI controls 406, 418A, and 418B. Other types of UI controls can also be utilized in other configurations for specifying the time period.

In the example shown in FIG. 4A, the log data 104 has been obtained from the RTLA service 102 for the specified hosts 106 for the time period from 12:00 and 17:00 and presented in the UI 114 as the line graph 414. The event data 120 has also been retrieved from the RTLA service 102 and presented as the vertical text 416A and 416B. The vertical text 416A and 416B has been positioned on the X-axis 412 at the corresponding time at which the events occurred. The event represented by the vertical text 416A, for example, occurred at 12:00. The event represented by the vertical text 416B occurred at 17:00.

As illustrated in FIG. 4A, the UI 114 can also include a UI control 402, or controls, for specifying the hosts 106 for which event data 120 and log data 104 is to be displayed. In this example, the UI control 402 is utilized to specifying an "organization." The specified organization can be utilized to identify hosts 106 associated with the organization. Other mechanisms can be utilized to specify the hosts 106 for which event data 120 and log data 104 is to be presented in the UI 114.

As also shown in FIG. 4A, a UI control 404 can be utilized to specify the type of log data 104 that is to be presented in the UI 114. In this example, for instance, the UI control 404 has been utilized to specify that "faults" identified in the log data 104 are to be presented in the UI 114. As discussed above, the X-axis 410 represents the number of faults generated by the specified hosts 106 as indicated by the log data 104. In this regard, it is to be appreciated that other types of log data 104 can be specified using the UI control 404 and presented in the UI 114 in other configurations. The UI control 404 can also be utilized to specify that all types of log data 104 are to be presented in the UI 114.

It is also to be appreciated, that a similar UI control 405 can also be utilized to specify the type of event data 120 that is to be presented in the UI 114. In the example shown in FIG. 4A, for instance, the UI control 405 has been utilized to specify that events relating to software deployment are to be presented in the UI 114. The UI control 405 can also be utilized to specify that all types of event data 120 are to be presented in the UI 114. It is to be further appreciated that the configuration shown in FIGS. 4A-4D is merely illustrative and that other configurations of UI elements can be utilized in other configurations.

Figure 4B:
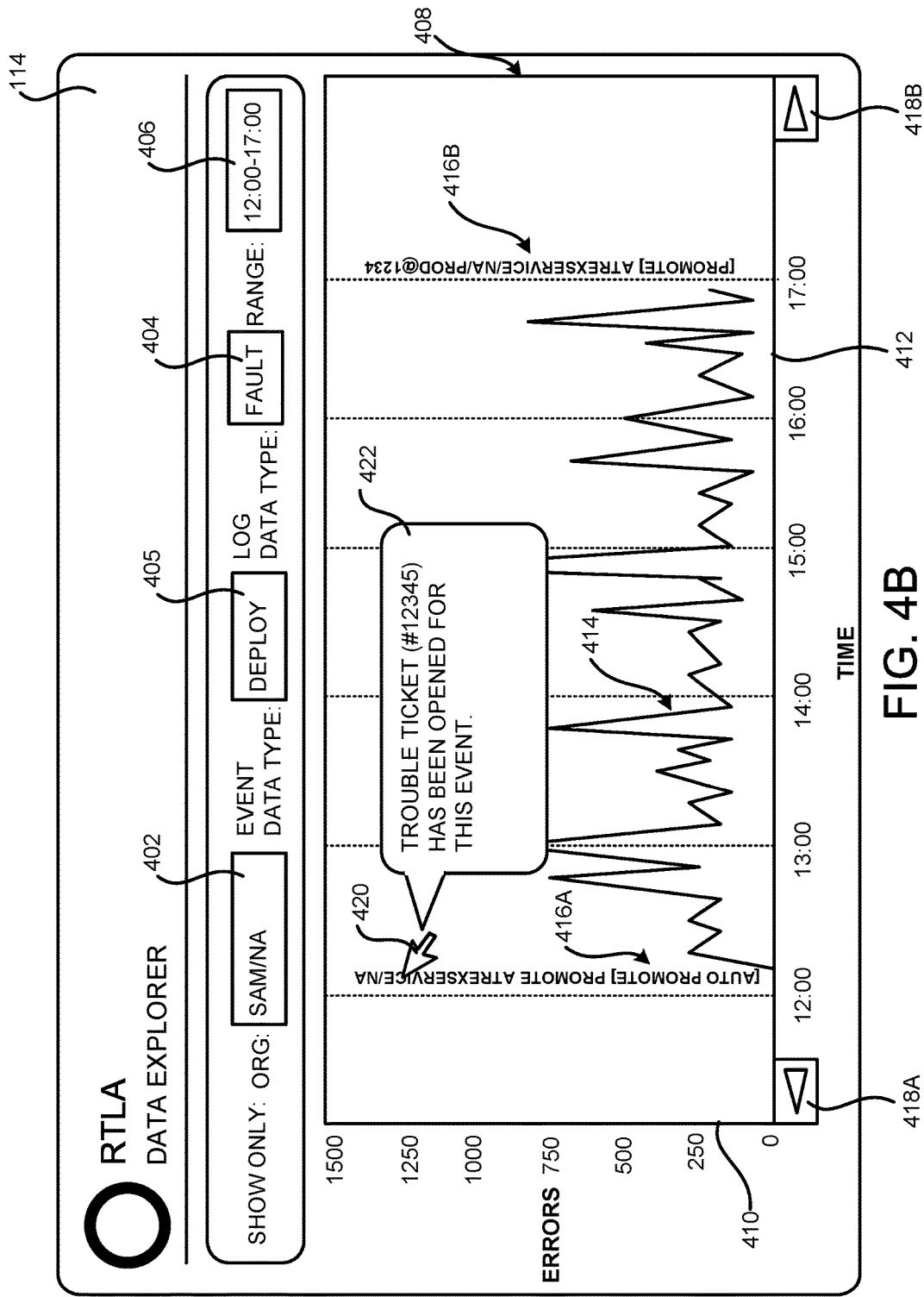
Figure 4C:
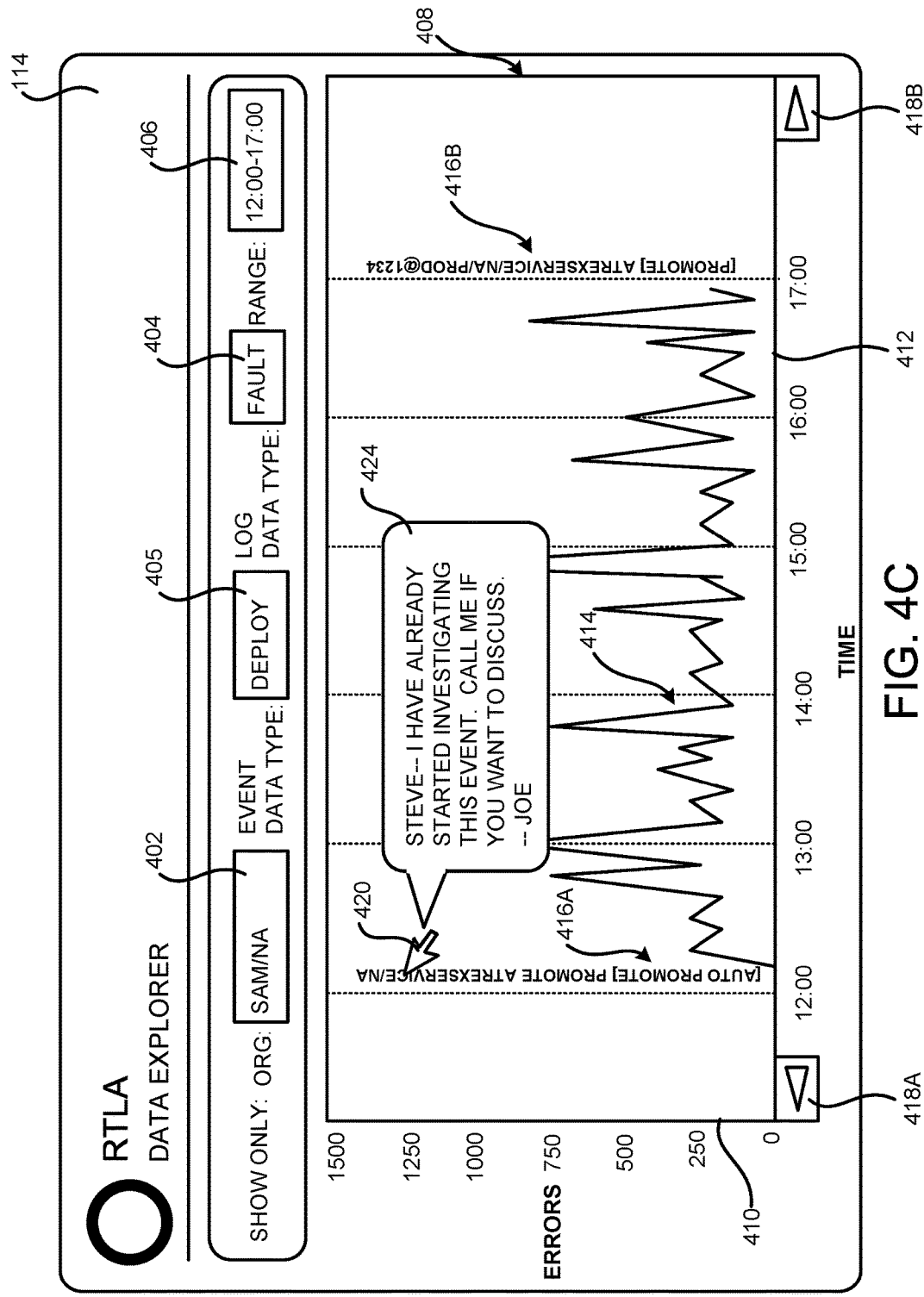
Figure 4D:
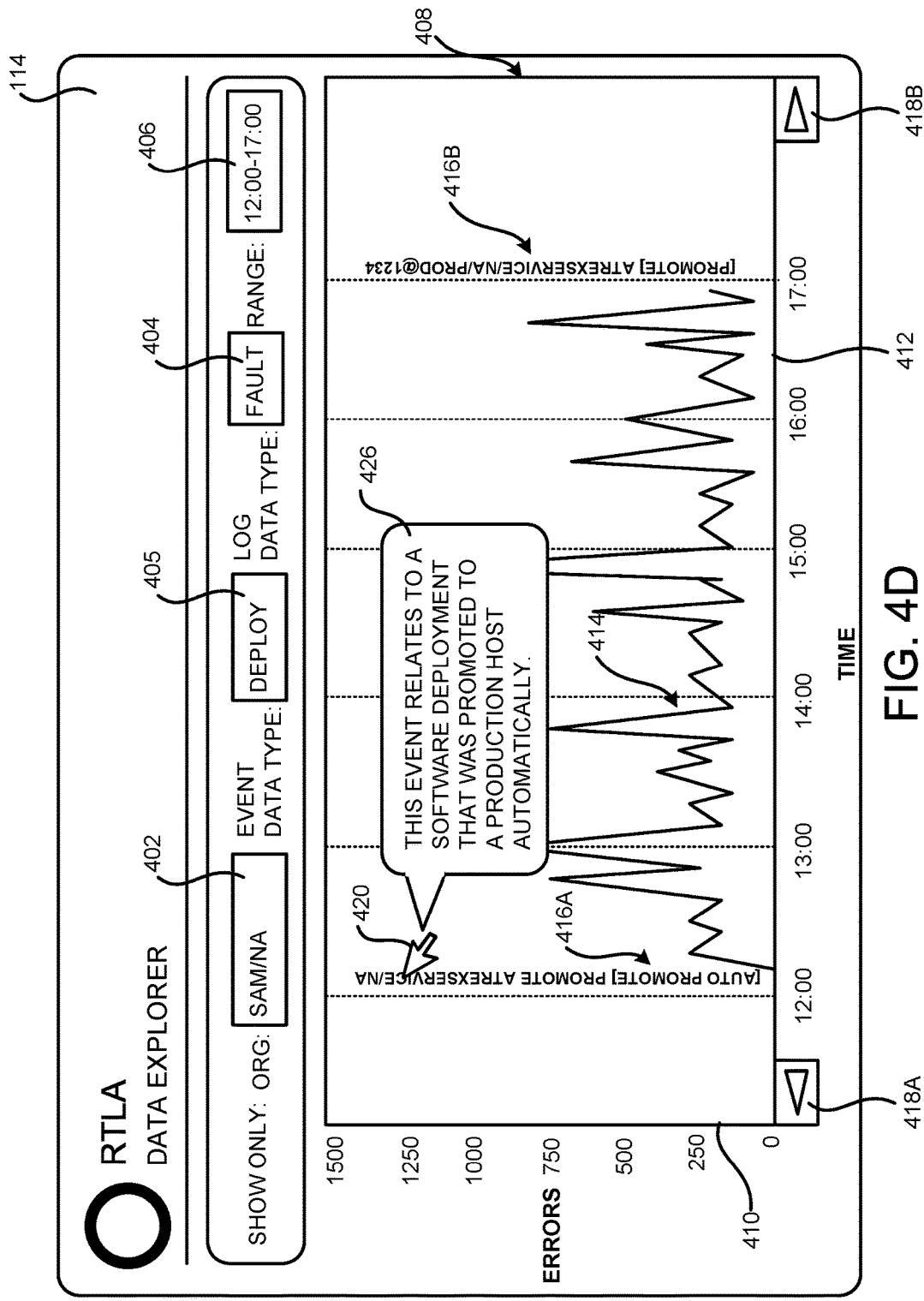

As illustrated in FIG. 4B, the UI 114 can also present other types of information relating to the event data 120 in other configurations. For instance, in the example configuration shown in FIG. 4B, the UI 114 (or the RTLA service 102) is configured to retrieve information regarding the events shown in the UI 114 from a trouble ticket system. This information can then be presented in the UI 114. For instance, a user of the UI 114 might select the vertical text 416A with a mouse cursor 420 (e.g. hover only or hover and click). In response thereto, text 422 can be presented that includes the information retrieved from the trouble ticket system. In this example, the text 422 indicates that a trouble ticket has already been opened for the event represented by the vertical text 416A.

In another configuration, the UI 114 allows a user to define and view annotations relating to an event represented by vertical text 416A. In the example shown in FIG. 4C, for instance, a user has defined a text annotation 424 and associated the annotation with the event represented by the vertical text 416A. Another user has utilized the mouse cursor 420 to select the vertical text 416A (e.g. hover only or hover and click). In response thereto, the text annotation 424 is displayed adjacent to the vertical text 416A.

In another configuration, the UI 114 can present a human-friendly text description 426 that describes the event represented by the vertical text 416A. In the example shown in FIG. 4D, a text description 426 has been defined and stored (e.g. by the RTLA service 102) that indicates that the corresponding event relates to a software deployment that was promoted to a production host automatically. In this example, a user has utilized the mouse cursor 420 to select the vertical text 416A (e.g. hover only or hover and click). In response thereto, the text description 426 of the corresponding event is displayed adjacent to the vertical text 416A. In this way, a human-friendly text description 426 for each event shown in the UI 114 can be presented to a user of the UI 114. In this regard, it is to be appreciated that the examples described above with regard to FIGS. 4A-4D are merely illustrative and that other types of information can be presented in the UI 114 in other configurations.

Figure 5:
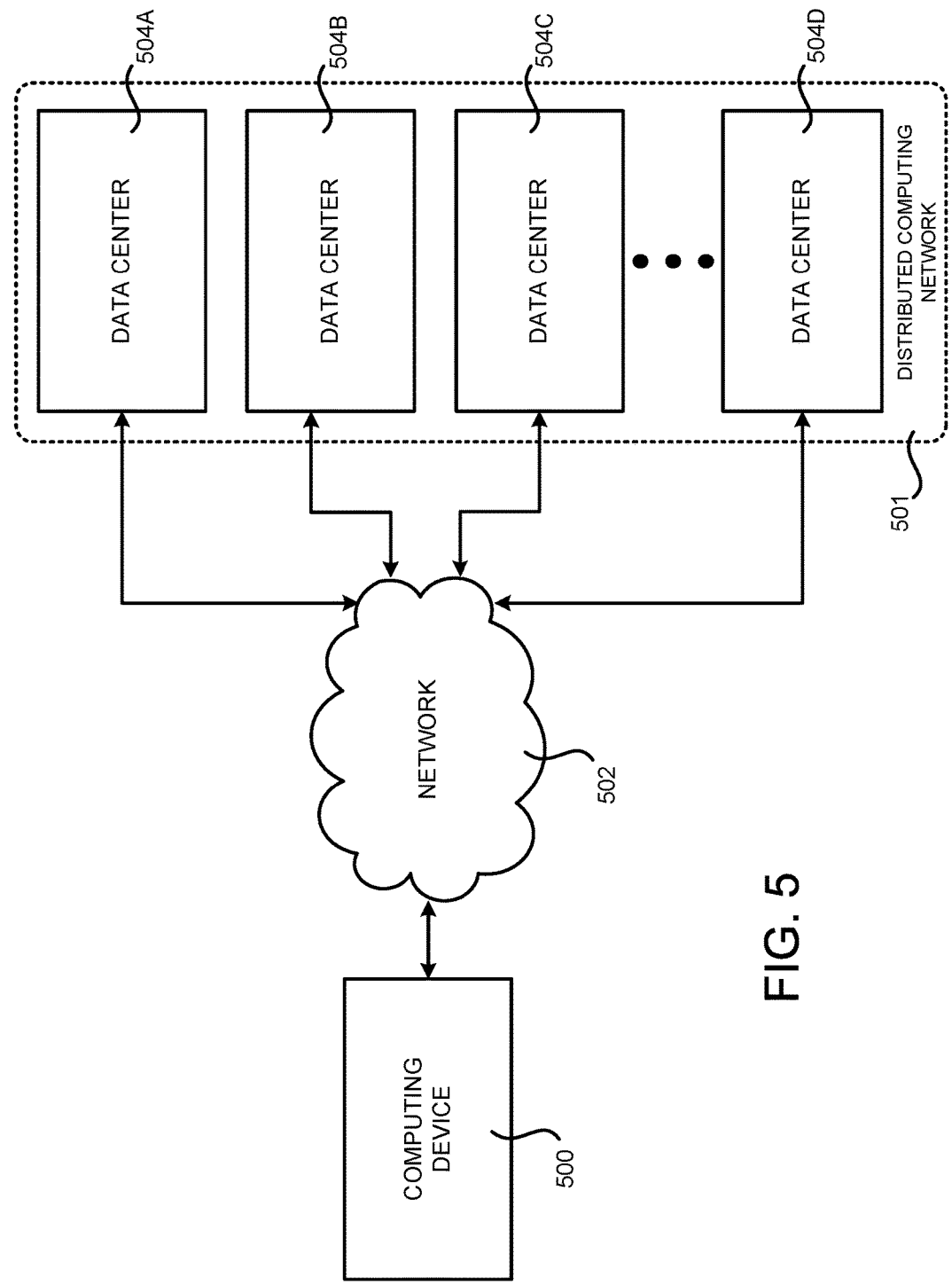
FIG. 5 is a system and network diagram that shows one illustrative operating environment for the configurations disclosed herein that includes a distributed computing network.

FIG. 5 is a system and network diagram that shows one illustrative operating environment for the configurations disclosed herein that includes a distributed computing network 501 that can be configured to implement the various technologies described above. The distributed computing network 501 can execute network services that provide computing resources on a permanent or an as-needed basis. Among other types of functionality, the computing resources provided by the distributed computing network 501 can be utilized to implement the various software components described herein. The computing resources provided by the distributed computing network 501 can include various types of computing resources, such as data processing resources like VM instances, data storage resources, networking resources, data communication resources, network services, and the like.

Each type of computing resource provided by the distributed computing network 501 can be general-purpose or can be available in a number of specific configurations. For example, data processing resources can be available as physical computers or VM instances in a number of different configurations. The VM instances can be configured to execute applications, including Web servers, application servers, media servers, database servers, some or all of the software components described above, and/or other types of programs. Data storage resources can include file storage devices, block storage devices, and the like. The distributed computing network 501 can also be configured to provide other types of computing resources not mentioned specifically herein.

As also discussed above, the computing resources provided by the distributed computing network 501 are enabled in one implementation by one or more data centers 504A-504D (which might be referred to herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations. One illustrative configuration for a data center 504 that can be utilized to implement the technologies disclosed herein will be described below with regard to FIG. 6.

Users of the distributed computing network 501 can access the computing resources provided by the distributed computing network 501 over a network 502, which can be a wide area communication network ("WAN"), such as the Internet, an intranet or an Internet service provider ("ISP") network or a combination of such networks. For example, and without limitation, a computing device 500 operated by a user of the distributed computing network 501 can be utilized to access the distributed computing network 501 by way of the network 502. It should be appreciated that a local-area network ("LAN"), the Internet, or any other networking topology known in the art that connects the data centers 504 to remote users can be utilized. It should also be appreciated that combinations of such networks can also be utilized.

Figure 6:
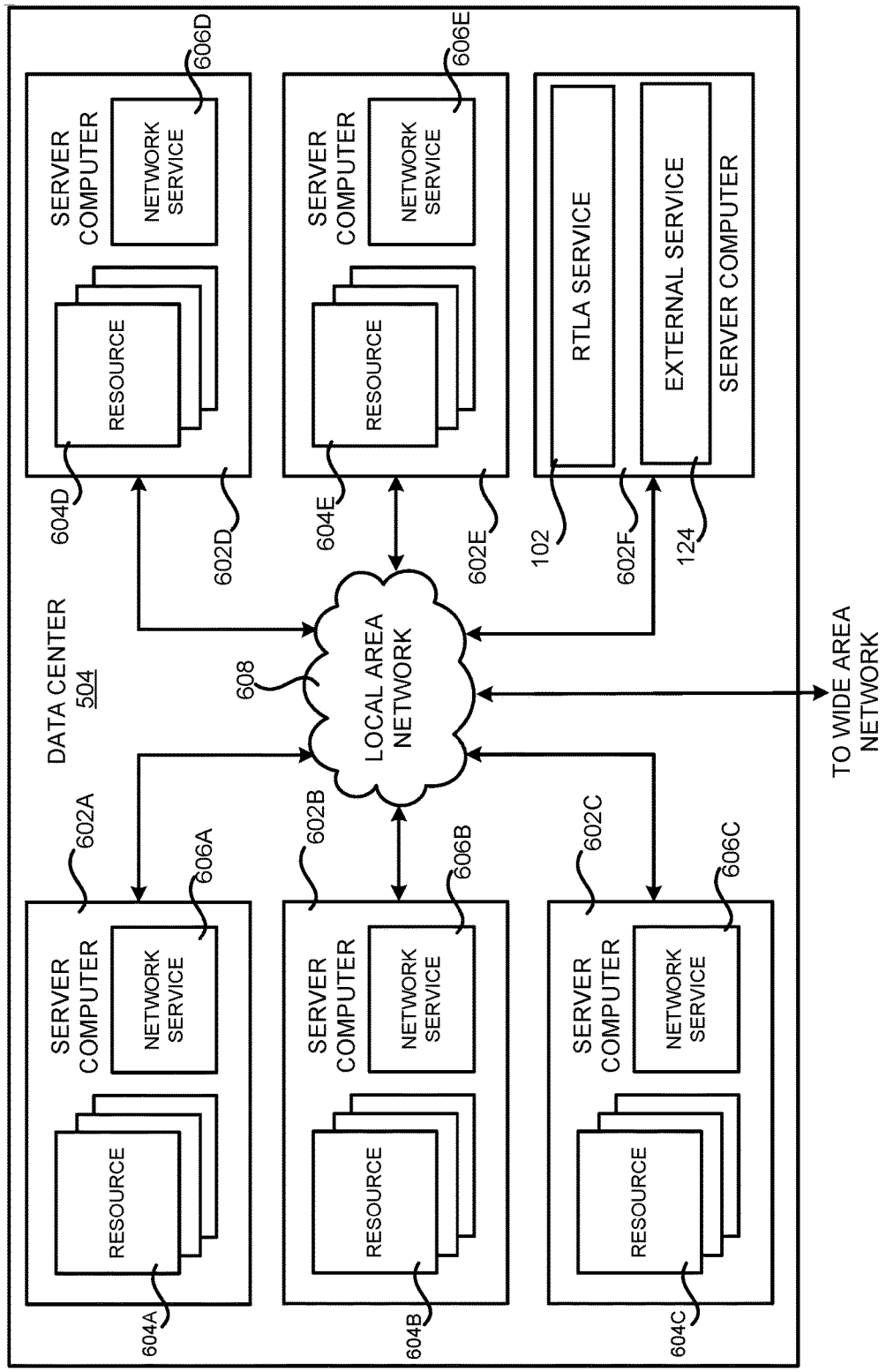
FIG. 6 is a computing system diagram illustrating a configuration for a data center that can be utilized to implement aspects of the technologies disclosed herein.

FIG. 6 is a computing system diagram that illustrates one configuration for a data center 504 that implements aspects of the technologies disclosed herein. The example data center 504 shown in FIG. 6 includes several server computers 602A-602F (which might be referred to herein singularly as "a server computer 602" or in the plural as "the server computers 602") for providing the computing resources 604A-604E.

The server computers 602 can be standard tower, rack-mount, or blade server computers configured appropriately for providing the computing resources 604 described herein (illustrated in FIG. 6 as the computing resources 604A-604E). As mentioned above, the computing resources 604 provided by the distributed computing network 501 can be data processing resources such as VM instances or hardware computing systems, data storage resources, database resources, networking resources, and others. Some of the servers 602 can also be configured to execute network services 606A-606E, respectively, capable of instantiating, providing and/or managing the computing resources 604.

The data center 504 shown in FIG. 6 also includes a server computer 602F that can execute some or all of the software components described above. For example, and without limitation, the server computer 602F can be configured to execute the RTLA service 102 and/or the external service 124, which were described in detail above. The server computer 602F can also be configured to execute other components and/or to store data for providing some or all of the functionality described herein. In this regard, it should be appreciated that the various software components disclosed herein can execute on many other physical or virtual servers in the data centers 504 in various configurations.

In the example data center 504 shown in FIG. 6, an appropriate LAN 608 is also utilized to interconnect the server computers 602A-602F. The LAN 608 is also connected to the network 502 illustrated in FIG. 5. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 504A-504D, between each of the server computers 602A-602F in each data center 504, and, potentially, between computing resources 604 in each of the data centers 504. It should be appreciated that the configuration of the data center 504 described with reference to FIG. 6 is merely illustrative and that other implementations can be utilized.

Figure 7:
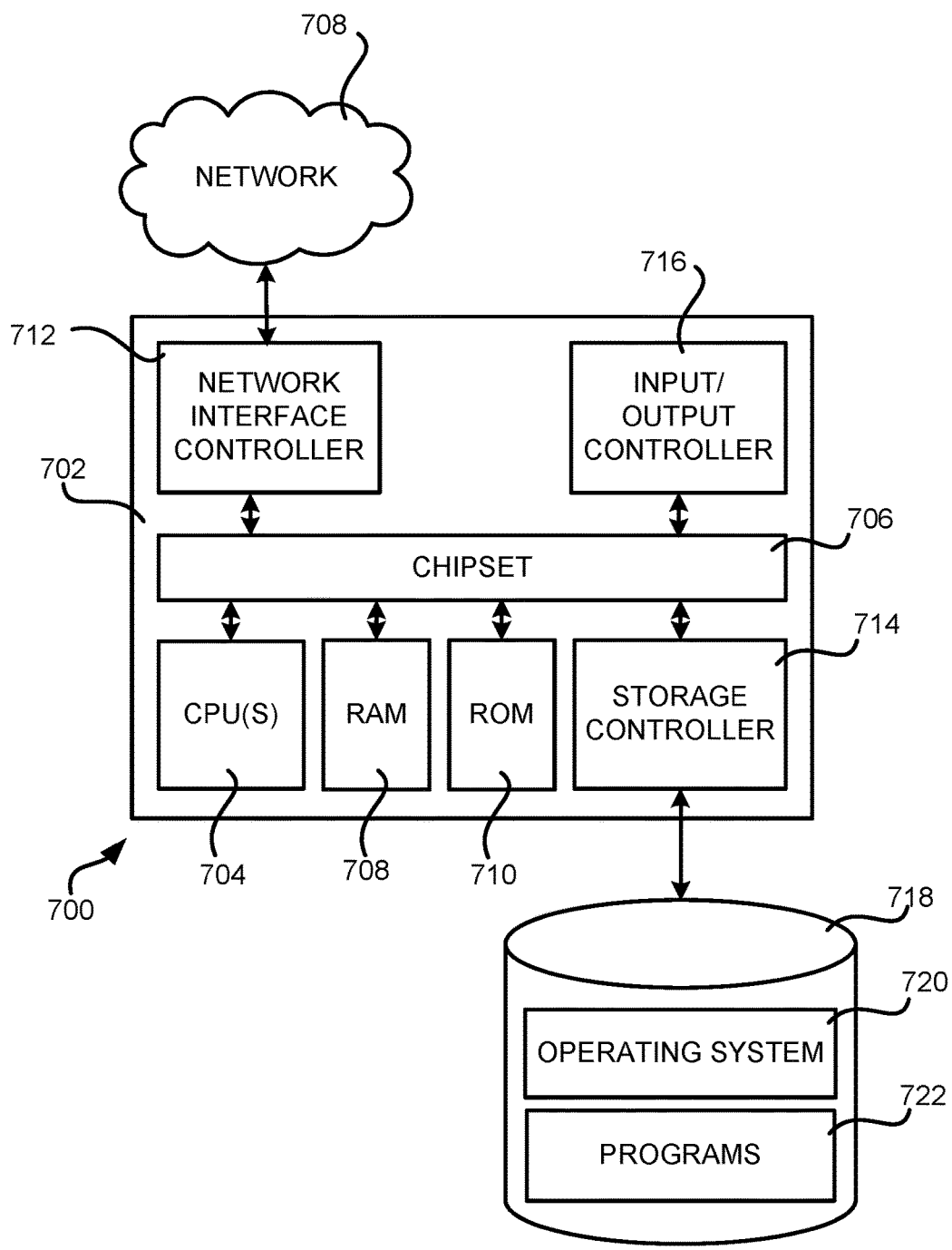
FIG. 7 is a computer architecture diagram showing an illustrative computer hardware architecture for implementing a computing device that can be utilized to implement aspects of the various technologies presented herein.

FIG. 7 shows an example computer architecture for a computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 708. The chipset 706 can include functionality for providing network connectivity through a NIC 712, such as a gigabit Ethernet adapter. The NIC 712 is capable of connecting the computer 700 to other computing devices over the network 708. It should be appreciated that multiple NICs 712 can be present in the computer 700, connecting the computer to other types of networks and remote computer systems.

The computer 700 can be connected to a mass storage device 718 that provides non-volatile storage for the computer. The mass storage device 718 can store an operating system 720, programs 722, and data, which have been described in greater detail herein. The mass storage device 718 can be connected to the computer 700 through a storage controller 714 connected to the chipset 706. The mass storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the mass storage device 718 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 718 is characterized as primary or secondary storage, and the like.

For example, the computer 700 can store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the mass storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 718 can store an operating system 720 utilized to control the operation of the computer 700. According to one configuration, the operating system comprises the LINUX operating system. According to another configuration, the operating system comprises the WINDOWS® SERVER operating system from MICROSOFT CORPORATION. According to further configurations, the operating system can comprise the UNIX operating system or one of its variants. It should be appreciated that other operating systems can also be utilized. The mass storage device 718 can store other system or application programs and data utilized by the computer 700.

In one configuration, the mass storage device 718 or other computer-readable storage media is encoded with computer-executable instructions which, when loaded into the computer 700, transform the computer from a general-purpose computing system into a special-purpose computer capable of implementing the configurations described herein. These computer-executable instructions transform the computer 700 by specifying how the CPUs 704 transition between states, as described above. According to one configuration, the computer 700 has access to computer-readable storage media storing computer-executable instructions which, when executed by the computer 700, perform the various processes described above with regard to FIGS. 1-4. The computer 700 can also include computer-readable storage media for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, a plotter, or other type of output device. It will be appreciated that the computer 700 might not include all of the components shown in FIG. 7, can include other components that are not explicitly shown in FIG. 7, or might utilize an architecture completely different than that shown in FIG. 7.

Based on the foregoing, it should be appreciated that technologies relating to an RTLA service 102 and an associated UI 114 capable of integrating log data 104 with event data 120 generated by one or more external services 124 have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. An apparatus, comprising:
one or more processors; and
one or more non-transitory computer-readable storage media having instructions stored thereupon which are executable by the one or more processors and which, when executed, cause the apparatus to:
receive a request from a computing device for log data for a time period, the log data being generated by a plurality of host computers;
responsive to the request for the log data, obtain the log data for the time period and provide the log data to the computing device;
receive a request from the computing device for event data for the time period, the event data being generated by one or more network services;
responsive to the request for the event data, query a distributed cache for the event data for the time period;
responsive to the query locating the event data for the time period in the distributed cache, retrieve the event data from the distributed cache and return the event data for the time period to the computing device in response to the request; and
responsive to the query not locating the event data for the time period in the distributed cache,
obtain the event data for the time period from the one or more network services,
store the event data for the time period obtained from the one or more network services in the distributed cache, and
return the event data for the time period to the computing device in response to the request,
wherein the computing device is configured to present a user interface (UI) comprising the log data for the time period and the event data for the time period.

2. The apparatus of claim 1, wherein the one or more non-transitory computer-readable storage media have further instructions stored thereupon to:
set a time-to-live (TTL) value for the event data in the distributed cache, the TTL value comprising a first value if the time period is in the past and comprising a second value if the time period is not in the past.

3. The apparatus of claim 1, wherein the UI is further configured to present one or more UI controls for specifying the time period.

4. The apparatus of claim 1, wherein the UI is further configured to present one or more UI controls for specifying the plurality of host computers.

5. The apparatus of claim 1, wherein the UI is further configured to present one or more UI controls for specifying a type of the event data.

6. The apparatus of claim 1, wherein the UI is further configured to present one or more UI controls for displaying data obtained from a trouble ticket system relating to the event data.

7. The apparatus of claim 1, wherein the UI is further configured to present one or more UI controls for defining and displaying an annotation relating to the event data.

8. A computer-implemented method, comprising:
causing one or more graphical user interface (UI) controls to be displayed in a first region of an interactive UI, the one or more UI controls enabling selection of a plurality of host computers and a period of time;
causing a graphical pane to be displayed in a second region of the interactive UI;
receiving a selection of the plurality of host computers and the period of time on the one or more UI controls;
retrieving log data for the plurality of host computers for the time period from a network service;
retrieving event data for the time period from the network service, the event data describing events related to operation of the plurality of host computers and occurring at one or more network services external to the plurality of host computers, wherein retrieving event data for the time period from the network service comprises:
querying a distributed cache for the event data for the time period;
in response to the querying locating the event data for the time period in the distributed cache, retrieving the event data from the distributed cache; and
in response to the querying not locating the event data for the time period in the distributed cache,
obtaining the event data for the time period from the one or more network services, and
storing the event data for the time period obtained from the one or more network services in the distributed cache; and
causing the graphical pane of the interactive UI to be updated to present the event data graphically integrated with the log data for the time period.

9. The computer-implemented method of claim 8, wherein the interactive UI is further configured to present one or more UI controls for specifying a type of the event data.

10. The computer-implemented method of claim 8, wherein the interactive UI is further configured to present one or more UI controls for displaying data obtained from a trouble ticket system relating to the event data.

11. The computer-implemented method of claim 8, wherein the interactive UI is further configured to present one or more UI controls for defining and displaying an annotation relating to the event data.

12. The computer-implemented method of claim 8, wherein the interactive UI is further configured to present a text description of the event data.

13. A non-transitory computer-readable storage media having instructions stored thereupon that are executable by one or more processors and which, when executed, cause the one or more processors to:

cause one or more graphical user interface (UI) controls to be displayed in a first region of an interactive UI, the one or more UI controls enabling selection of a plurality of host computers and a period of time;

cause a graphical pane to be displayed in a second region of the interactive UI;

receive a selection of the plurality of host computers and the period of time on the one or more UI controls;

retrieve log data for a plurality of host computers for a time period from a network service;

retrieve event data for the time period from the network service, the event data describing events related to operation of the plurality of host computers and occurring at one or more network services external to the plurality of host computers, wherein retrieving event data for the time period from the network service comprises to:

query a distributed cache for the event data for the time period;

in response to the query locating the event data for the time period in the distributed cache, retrieve the event data from the distributed cache; and in response to the query not locating the event data for the time period in the distributed cache, obtain the event data for the time period from the one or more network services, and store the event data for the time period obtained from the one or more network services in the distributed cache; and cause the graphical pane of the interactive UI to be updated to present the event data graphically integrated with the log data for the time period.

14. The non-transitory computer-readable storage media of claim 13, wherein the interactive UI is further configured to present one or more UI controls for displaying data obtained from a trouble ticket system relating to the event data.

15. The non-transitory computer-readable storage media of claim 13, wherein the interactive UI is further configured to present one or more UI controls for defining and displaying an annotation relating to the event data.

16. The non-transitory computer-readable storage media of claim 13, wherein the interactive UI is further configured to present a text description of the event data.

17. The computer-implemented method of claim 8, wherein the event data describes deployments of program code to the plurality of host computers by a deployment service external to the plurality of host computers.

18. The non-transitory computer-readable storage media of claim 13, wherein the event data describes deployments of program code to the plurality of host computers by a deployment service external to the plurality of host computers.

19. The computer-implemented method of claim 8, further comprising:

setting a time-to-live (TTL) value for the event data in the distributed cache, the TTL value comprising a first value if the time period is in the past and comprising a second value if the time period is not in the past.

20. The non-transitory computer-readable storage media of claim 13, wherein the instructions are further executable by the one or more processors to:

set a time-to-live (TTL) value for the event data in the distributed cache, the TTL value comprising a first value if the time period is in the past and comprising a second value if the time period is not in the past.

* * * * *